United States Patent [19]
Hasegawa et al.

[11] Patent Number: 5,533,045
[45] Date of Patent: Jul. 2, 1996

[54] AUTOMATIC VEHICLE IDENTIFICATION SYSTEM, INTERROGATOR AND RESPONDER INCLUDED IN THE SAME

[75] Inventors: Makoto Hasegawa, Tokyo; Naoki Adachi, Kawasaki; Masahiro Mimura, Tokyo; Hirohide Hirabayashi; Hideko Sakai, both of Yokohama, all of Japan

[73] Assignee: Matsushita Electric Industrial Co., Ltd., Osaka, Japan

[21] Appl. No.: 191,690

[22] Filed: Feb. 4, 1994

[30] Foreign Application Priority Data

Feb. 5, 1993 [JP] Japan .................................. 5-018377
Apr. 14, 1993 [JP] Japan .................................. 5-087030

[51] Int. Cl.$^6$ ............................................... H04B 1/69
[52] U.S. Cl. .................................... 375/200; 375/208
[58] Field of Search .............................. 375/1, 200, 208; 380/48

[56] References Cited

U.S. PATENT DOCUMENTS 4,897,659  1/1990  Mellon ........................................ 380/48
5,056,106  10/1991  Wang et al. ................................. 375/1

FOREIGN PATENT DOCUMENTS 28770  1/1990  Japan .

*Primary Examiner*—Salvatore Cangialosi
*Attorney, Agent, or Firm*—Lowe, Price, LeBlanc & Becker

[57] ABSTRACT

A mobile unit identifying system comprises: an interrogator having: a spread spectrum signal generation circuit for generating a spread spectrum coding signal using a predetermined pseudo noise signal; and a transmitting antenna for transmitting the spread spectrum coding signal; and a responder having: a memory for storing data; and a modulation unit for modulating radio signals including the transmitted spread spectrum coding signal with the data, the interrogator further comprising: a receiving antenna for receiving the modulated radio signals; and a mixer for mixing the received radio signals with the spread spectrum signal to detect the data. The responder has one or two antennas for receiving or reflecting the spread spectrum coding signal with modulation using a predetermined data. Phase adjusting circuits may be provided in both interrogator and responder to distinguished from reflected waves from reflective objects other than the responder. The responding signal from the responder is distinguished from the reflected waves from the reflective objects through a polarizing transmitting or receiving technique.

17 Claims, 7 Drawing Sheets

5,533,045

AUTOMATIC VEHICLE IDENTIFICATION SYSTEM, INTERROGATOR AND RESPONDER INCLUDED IN THE SAME

BACKGROUND OF THE INVENTION

1. Field of the Invention

This invention relates to an automatic vehicle identification system, an interrogator and responder included in the same, the interrogator recognizing the responder by transmitting an interrogating signal and receiving a responding signal from the responder to identify the responder.

2. Description of the Prior Art

Automatic vehicle identification systems are known. Such automatic vehicle identification systems have interrogators and responders. The interrogator identifies a responder by transmitting an interrogating signal and receiving a responding signal from the responder.

In one of such automatic vehicle identification systems, the interrogator transmits the interrogating signal through a microwave radio signal. A responder entering a service area of the interrogator receives the interrogating signal and effects a spectrum coding with a predetermined data. Then, the responder transmits the responding signal to the interrogator. The interrogator can recognize the responder because the interrogator has the predetermined data also and decode the responding signal with the data.

FIG. 7 is a block diagram of such a prior art automatic vehicle identification system. In FIG. 7, an interrogator 401 continuously transmits an interrogating signal X obtained by modulating an oscillation signal from an oscillator 440 with predetermined data by the modulator 441 through an transmitting antenna 442. When a responder 404 enters a service area of the interrogator 401, the responder 404 detects the presence of the interrogating signal X received by a receiving antenna 443 and then, spread-spectrum-codes the interrogating signal X with an identification code stored in an identification code memory 444 provided thereto and transmits a spread-spectrum-coded interrogating signal X as a responding signal Y through a transmission antenna 446. The interrogator 401 receives the responding signal Y and demodulates the received responding signal Y with one of identification codes read from a memory table 447 provided therein and detects a reproduction condition of the demodulated response signal. When the reproduction condition is not sufficient, that is, synchronization between the interrogator and the responder is not obtained, the read identification code used in the responder 404 does not agree with the identification code read from the memory table 447. Then, the interrogator 401 reads another identification data from the memory table 447 and demodulates the received response signal. This operation is repeated until the reproduction condition of the received response signal is sufficient. When the reproduction condition is sufficient, the interrogator can identifies the responder and produces an output signal 450 obtained by demodulating the received response signal by the spread spectrum demodulator 449.

However, in the above-mentioned prior art, there is a problem that the spread spectrum modulator 445 is necessary in the responder 404 though the responder 404 is required to have a small size and a low power consumption.

However, in the interrogator 401, a circuit for identification between the interrogator 401 and the responder 404, so that sizes of the interrogator 401 was large.

SUMMARY OF THE INVENTION

The present invention has been developed in order to remove the above-described drawbacks inherent to the conventional automatic vehicle identification system.

According to the present invention there is provided a mobile unit identifying system comprising: an interrogator having: a spread spectrum signal generation circuit for generating a spread spectrum coding signal using a predetermined pseudo noise signal; and a transmitting antenna for transmitting the spread spectrum coding signal; and a responder having: a memory for storing data; a modulation unit for modulating radio signals including the transmitted spread spectrum coding signal with the data; and an antenna for sending the modulated radio signals, the interrogator further comprising: a receiving antenna for receiving the modulated radio signals; and a mixer for mixing the received radio signals with the spread spectrum signal to detect the data.

According to the present invention there is also provided a mobile unit identifying system comprising: an interrogator having: a spread spectrum signal generation circuit for generating a spread spectrum coding signal using a predetermined pseudo noise signal; a carrier signal generation circuit for generating a carrier signal; a first mixer for mixing the spread spectrum coding signal with the carrier signal to produce an interrogating signal; a transmitting antenna for transmitting the interrogating signal; and a responder having: a memory for storing data; a modulation unit for modulating radio signals including the transmitted spread spectrum coding signal with the data; and an antenna for sending the modulated radio signals, the interrogator further comprising: a receiving antenna for receiving the modulated radio signals; and a second mixer for mixing the received radio signals with the carrier signal; a third mixer for mixing an output signal of the second mixer with the spread spectrum signal to detect the data. This system includes a heterodyne structure.

According to the present invention there is further provided a mobile unit identifying system comprising: an interrogator having: a spread spectrum signal generation circuit for generating a spread spectrum coding signal using a predetermined pseudo noise signal; a first antenna for transmitting the spread spectrum coding signal; an responder having: a second antenna for receiving radio signals including the transmitted spread spectrum coding signal; a memory for storing data; a modulating unit for modulating the received radio signals including the transmitted spread spectrum coding signal with the data; a third antenna for sending the radio signals to the interrogator with modulating in accordance with the modulated radio signals, the interrogator further comprising: a fourth antenna for receiving the sent radio signals; and a mixer for mixing the sent and received radio signals with the spread spectrum signal to detect the data. In this system, phase adjusting circuits may be provided in the interrogator and the responder to reduce effect of reflected wave from reflective objects other than the responder.

The responding signal may be distinguished from reflected waves from reflective objects other than the responder by linearly polarizing or circularly polarizing techniques.

BRIEF DESCRIPTION OF THE DRAWINGS

The object and features of the present invention will become more readily apparent from the following detailed description taken in conjunction with the accompanying drawings in which.

The same or corresponding elements or parts are designated as like references throughout the drawings.

DETAILED DESCRIPTION OF THE INVENTION

Hereinbelow will be described a first embodiment of this invention.

Figure 1:
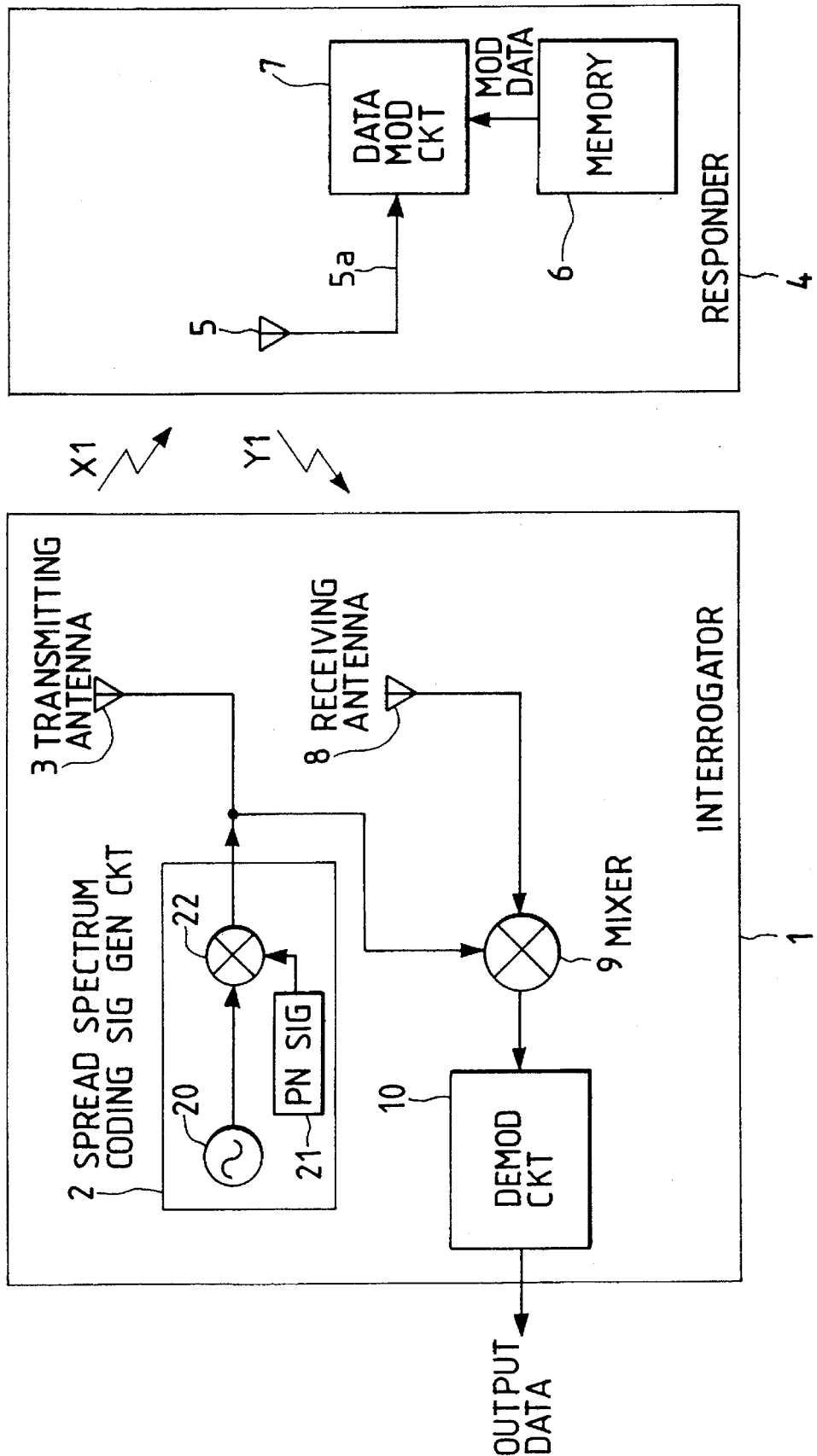
FIG. 1 is a block diagram of a first embodiment of an automatic vehicle identification system of the invention.

FIG. 1 is a block diagram of the first embodiment of an automatic vehicle identification system of the invention. An interrogator 1 comprises a spread spectrum coding signal generating circuit 2 for generating a spread spectrum coding signal by spread-spectrum-modulating a carrier signal and a transmitting antenna 3 for transmitting the spread spectrum coding signal as an interrogating signal X1. The spread spectrum coding signal generating circuit 2 has a pseudo noise generation circuit 21 for generating one of plural types of pseudo noise signals, an oscillator 20 for generating a high frequency signal as a carrier signal, and a mixer 22 for mixing the carrier signal with the pseudo noise signal to generate a spread spectrum coding signal.

The responder 4 comprises a receiving and reflection antenna 5 for receiving the interrogating signal X1, a data modulation circuit 7 for modulating the received interrogating signal X1 with modulation data stored in the memory 6 by changing an impedance condition of the receiving and reflection antenna 5 to the data modulation circuit 7 to alternate the reflection and absorption conditions of the interrogating signal X1, the modulated interrogating signal X1 being transmitted by the receiving and reflection antenna 5 as a responding signal Y1. The interrogator 1 further comprises a receiving antenna 8 for receiving the responding signal Y1, a mixer 9 for mixing the received responding signal Y1 with the spread spectrum coding signal for decoding the responding signal Y1, and a demodulating circuit 10 for demodulating the decoded responding signal Y1 for supplying output data corresponding to the modulation data stored in the memory 6.

Operation of the first embodiment will be described.

In the interrogator 1, the spread spectrum coding signal generating circuit 2 generates the spread spectrum coding signal by spread-spectrum-modulating the carrier signal inputted thereinto. The spread spectrum coding signal generating circuit 2 spread-spectrum-modulates the carrier signal with a pseud noise signal (PN signal) which is selected from plural types of pseud noise signals generated in the spread spectrum coding signal generating circuit 2. However, a selection circuit for selecting the pseud noise from plural types of pseud noise signals is omitted here. More specifically, in the spread spectrum coding signal generating circuit 2, the pseudo noise generation circuit 21 generates one of plural types of pseudo noise signals an oscillator 20 generates the high frequency signal as the carrier signal, and the mixer 22 mixes the carrier signal with the pseudo noise signal to generate the spread spectrum coding signal. The spread-spread spectrum coding signal from the spread spectrum coding signal generation circuit 2 is transmitted by the transmitting antenna 3 as the interrogating signal X1 and is also supplied to the mixer 9. If the responder 4 exists in or enters a service area of the interrogator 1, the receiving and reflection antenna 5 of the responder 4 receives the interrogating signal X1. The data modulation circuit 7 modulates the received interrogating signal X1 with modulation data read from the memory 6 by changing the impedance condition of the receiving and reflection antenna 5 to the data modulation circuit 7. More specifically, the data modulation circuit 7 alters adequately changing an electrical length of a feeder cable 5a from the receiving and reflection antenna 5a to absorb the received interrogating signal X1 and shorting the ends of the feeder cable 5a to reflects the interrogating signal X1 in order to modulate the interrogating signal X1 in accordance with the modulation data read from the memory 6. The modulated interrogating signal X1 is reflected by the receiving and reflection antenna 5 as the responding signal Y1.

In the interrogator 1, the receiving antenna 8 receives the responding signal Y1. The received responding signal Y1 is mixed with the spread spectrum coding signal from the spread spectrum coding signal generation circuit 2 to decode the received responding signal Y1. The decoded responding signal Y1 is demodulated by the demodulating circuit 10 to supply the output data corresponding to the modulation data stored in the memory 6. This output data provides identification of the responder 4 because the carrier signal is modulated with a predetermined pseudo noise signal as the interrogating signal X1 which is different from interrogating signals from other interrogators. That is, the responding signal generated from the interrogating signal from the another interrogator has no correlation with the spread spectrum coding signal generated by this interrogator 1, so that this responding signal cannot be demodulated but only the responding signal derived from the spread spectrum coding signal generated by this interrogator is demodulated. Therefore, the spread spectrum coding signal generation circuit 2 provides the surer identification of the responder 4 in the service area.

Here, generally, in the automatic vehicle identification system, a propagation distance, that is a radii of the service area is assumed as several meters which is relatively short. Therefore, a phase difference between the spread coded signal and the received responding signal Y1 is of the order of $10^{-8}$ seconds and is negligible, so that in the interrogator 1, the responding signal Y1 received by the receiving antenna 8 is directly mixed with the spread spectrum coding signal by the mixer 9 to decodes the responding signal Y1. Therefore, the spread spectrum coding signal generation circuit 2 can be used for the transmission of the interrogating signal X1 and for demodulating the responding signal Y1 with a simple structure because a complicated phase matching between the spread spectrum coding signal and the received responding signal Y1 is unnecessary.

Figure 2:
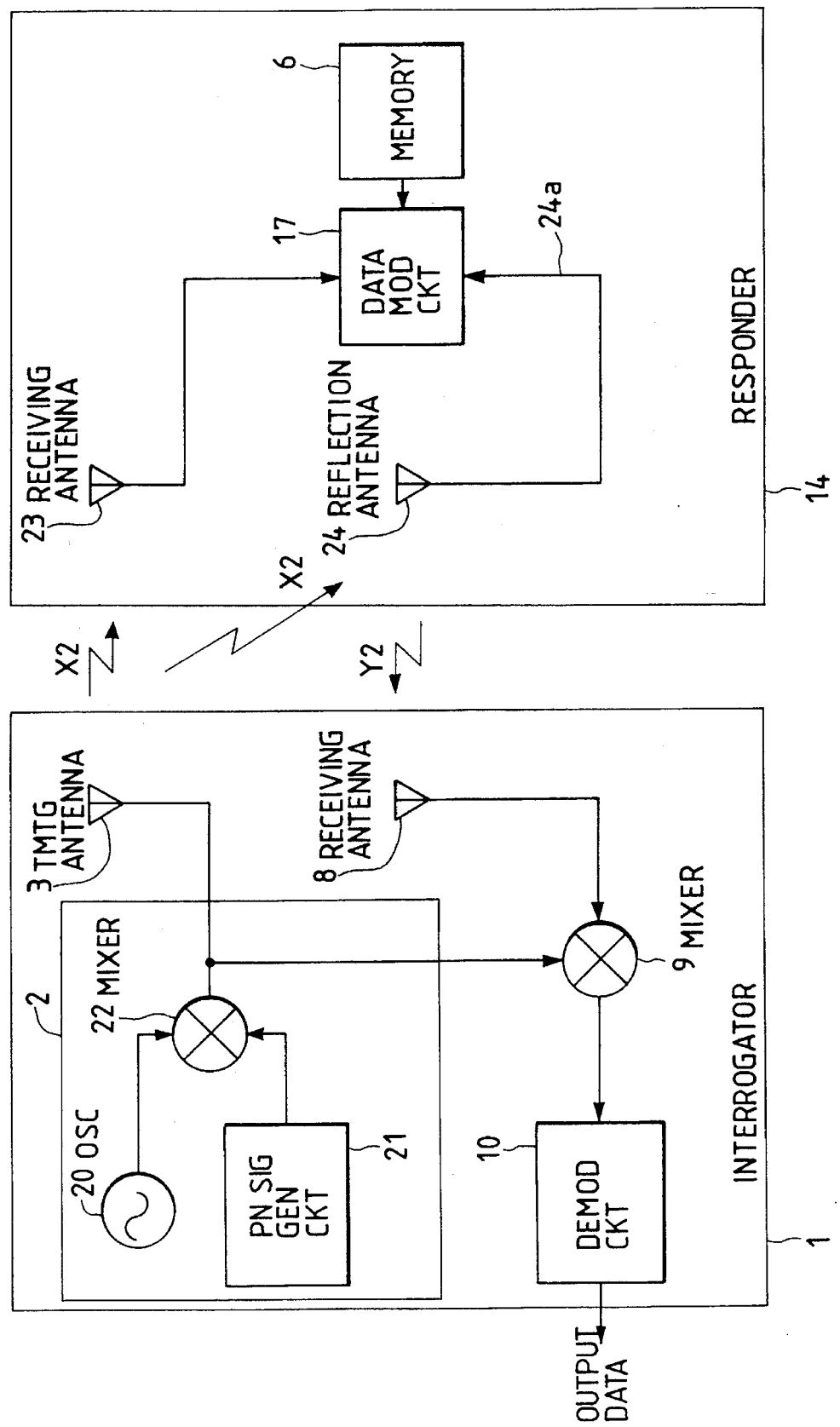
FIG. 2 is a block diagram of a second embodiment of an automatic vehicle identification system of the invention.

FIG. 2 is a block diagram of a second embodiment of an automatic vehicle identification system of the invention. An interrogator 1 comprises a spread spectrum coding signal generating circuit 2, for generating a spread spectrum coding signal, having a pseudo noise generation circuit 21 for generating one of plural types of pseudo noise signals, an oscillator 20 for generating a high frequency signal as a carrier signal, and a mixer 22 for mixing the carrier signal with the pseudo noise signal to generate a spread spectrum coding signal and a transmitting antenna 3 for transmitting the spread spectrum coding signal as an interrogating signal X2. The responder 14 comprises a receiving antenna 23 for receiving the interrogating signal X2, a reflection antenna 24, and a memory 6, the modulated interrogating signal X2 being reflected by the reflection antenna 24 as a responding signal Y2.

The interrogator 1 further comprises a receiving antenna 8 for receiving the responding signal Y2, a mixer 9 for mixing the received responding signal Y2 with the spread spectrum coding signal for decoding the responding signal Y2, and a demodulating circuit 10 for demodulating the decoded responding signal Y2 for supplying output data corresponding to the modulation data stored in the memory 6.

Operation of the second embodiment will be described.

In the interrogator 1, the pseudo noise signal generation circuit 21 of the spread spectrum coding signal generating circuit 21 generates a pseudo noise signal as the spread spectrum coding signal. The mixer 22 mixes the carrier signal generated by the oscillator 20 with a pseudo noise signal (PN signal) which is selected from plural types of pseud noise signals generated in the spread spectrum coding signal generating circuit 2. However, a selection circuit for selecting the pseud noise from plural types of pseud noise signals is omitted here. The spread-spread spectrum coding signal from the spread spectrum coding signal generation circuit 2 is transmitted by the transmitting antenna 3 as the interrogating signal X2 and is also supplied to the mixer 9. If the responder 14 exists in or enters a service area of the interrogator 1, the receiving antenna 23 of the responder 14 can receive the interrogating signal X2. The data modulation circuit 7 modulates the received interrogating signal X2 with modulation data read from the memory 6 by changing the amplitude caused by the change of impedance or phase or frequency of the signal X2 to the data modulation circuit 17 to alternate the reflection and absorption conditions of the interrogating signal X2. More specifically, the data modulation circuit 17 alters adequately changing the electrical length of a feeder cable 24a from the reflection antenna 24 and shorting the ends of the feeder cable 24a to reflects the interrogating signal X2 in order to modulate the phase of interrogating signal X2 in accordance with the modulation data read from the memory 6. The modulated interrogating signal X2 is sent by the reflection antenna 24 as the responding signal Y2.

In the interrogator 1, the receiving antenna 8 receives the responding signal Y2. The received responding signal Y2 is mixed with the spread spectrum coding signal from the spread spectrum coding signal generation circuit 2 by the mixer 9 to decode the received responding signal Y2. The decoded responding signal Y2 is demodulated by the demodulating circuit 10 to supply the output data corresponding to the modulation data stored in the memory 6. This output data provides identification of the responder 14 because the carrier signal is modulated with a predetermined pseudo noise signal as the interrogating signal X2 which is different from interrogating signals from other interrogators. That is, the responding signal generated from the interrogating signal from the another interrogator has no correlation with the spread spectrum coding signal generated by this interrogator 1, so that this responding signal cannot be demodulated but only the responding signal derived from the spread spectrum coding signal generated by this interrogator 1 can be demodulated. Therefore, the spread spectrum coding signal generation circuit 2 provides the surer identification of the responder 14 in the service area.

This spread spectrum coding signal has no data component but provides a function for eliminating a correlation between the received responding signal responding to the interrogating signal X2 and responding signals responding to other interrogators.

In the first embodiment, the antenna provided in the responder 4 for receiving the interrogating signal X is also used for reflection commonly. However, the responder 14 of the second embodiment has the receiving antenna 23 and the reflection antenna 24 separately, so that a various data modulating method is applicable. Therefore, degrees of freedom in the structure of the antennas and the data modulating method is large.

As mentioned above, according to this embodiment, though a plurality of another interrogators exist in the service area of the interrogator 1, this structure eliminates effect of the other interrogators. Moreover, the spread spectrum coding signal generation circuit can be used commonly between the transmitting the interrogating signal X2 and the receiving the responding signal Y2, so that a simple structure is provided because a complicated phase matching is not required. Further, the degrees of freedom in the selection of the structure of the antennas and modulation method in the responder are larger.

Figure 3:
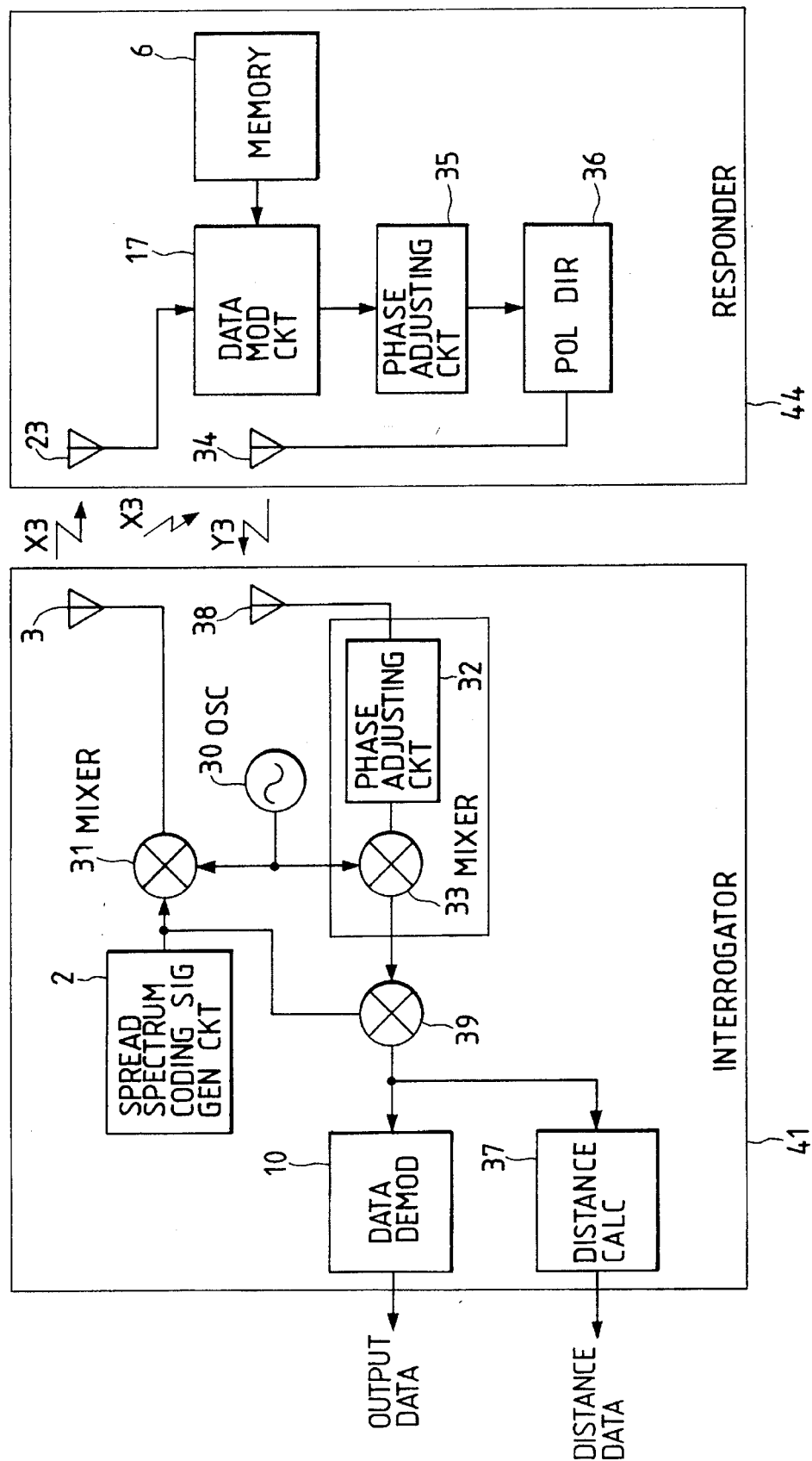
FIG. 3 is a block diagram of a third embodiment of an automatic vehicle identification system of the invention.

FIG. 3 is a block diagram of a third embodiment of an automatic vehicle identification system of the invention. An interrogator 41 comprises a spread spectrum coding signal generating circuit 2, for generating a spread spectrum coding signal, an oscillator 30 for generating a local frequency signal, and a mixer 31 for mixing the spread spectrum coding signal with the local frequency signal to generate a radio frequency signal. The radio frequency signal is transmitted by the transmitting antenna 3 as an interrogating signal X3. The responder 44 comprises a receiving antenna 23 for receiving the interrogating signal X3, a reflection antenna 34, and a memory 6, and a data modulation circuit 17 for modulating the received interrogating signal X3 with modulation data stored in the memory 6, a phase adjusting circuit 35 for phase adjusting the modulated interrogating signal X3, and a polarizing direction converting circuit 36 for converting a polarizing direction of a reflected interrogating signal by the reflection antenna 34 as a responding signal Y3.

The interrogator 41 further comprises a receiving antenna 38 for receiving the responding signal Y3, a phase adjusting circuit 32 for adjusting a phase of the received responding signal Y3, a mixer 33 for mixing the carrier signal from the oscillator 30 to demodulate the received responding signal Y3 in order to obtain a low frequency responding signal, a mixer 39 for mixing the low frequency responding signal with the spread spectrum coding signal for decoding the responding signal, a demodulating circuit 10 for demodulating the decoded responding signal Y3 for supplying output data corresponding to the modulation data stored in the memory 6, and a distance calculator 37 for calculating a distance between the interrogator 41 and the responder 44 to supply a distance data.

Operation of the third embodiment will be described. In the interrogator 41, the spread spectrum coding signal generating circuit 2 generates the spread spectrum coding signal. The oscillator 30 generates the local frequency signal and a mixer 31 mixes the spread spectrum coding signal with the local frequency to generate a radio frequency signal as the interrogating signal X3. That is, a frequency added or subtracted signal is generated by the mixer 31 and is transmitted as the interrogating signal X3. Therefore, a frequency of the output of the spread spectrum coded signal can be considerably lowered because the frequency of the spread spectrum coded signal is increased by the mixer 31.

In the responder 44, the receiving antenna 23 receives the interrogating signal X3. The data modulation circuit 17 modulates the received interrogating signal X3 with modulation data stored in the memory 6. The phase adjusting circuit 35 adjusts a phase relation between the received interrogating signal X3 and the reflected interrogating signal, i.e., the responding signal Y3. The polarizing direction converting circuit 36 converts the polarizing direction of the reflected interrogating signal by the reflection antenna 34 as the responding signal. Y3.

In the interrogator 41, the receiving antenna 38 receives the responding signal Y3. The phase adjusting circuit 32 adjusts a phase of the received responding signal Y3. The mixer 33 mixes the local frequency signal from the oscillator 30 to demodulate the received responding signal Y3 in order to obtain the low frequency responding signal. The mixer 39 mixes the low frequency responding signal with the spread spectrum coding signal to decode the responding signal Y3. The demodulating circuit 10 demodulates the decoded responding signal Y2 to supply output data corresponding to the modulation data stored in the memory 6. The distance calculator 37 calculates the distance between the interrogator 41 and the responder 44 to supply the distance data by detecting a phase deviation of the responding signal from the actual position of the responder 44 from the responding signal at a reference location of the responder 44.

In the structure shown in FIG. 3, the phase adjusting circuit 32, the distance calculator 37, and the phase adjusting circuit 35, the polarizing converting circuit 36 are provided. However, these circuits are not always necessary.

The distance calculator 37 detects a phase deviation in the output of the mixer 39 of the order of $10^{-8}$ sec which is proportional to the distance from the interrogator 41 to the responder 44 when the spread spectrum coding signal generation circuit 2 generates the spread spectrum coding signal having a data rate of 10 Mbps which is higher than the normal data rate.

The phase adjusting circuits 32 and 35 are provided for reduce effect of the reflection from the other responders etc. by distinguishing the reflected responding signal from reflected waves from other reflective objects. That is, the phase adjusting circuit 35 delays the output of the data demodulation circuit 17 by a predetermined delay time. Thus, the responding signal is delayed against reflected waves from reflective objects other than the responder, so that the responding signal can be detected by the spread spectrum coding signal by the mixer 39 with reflected waves received by the antenna 38 suppressed.

Moreover, the phase adjusting circuit 32 may be provided between the oscillator 30 and the mixer 33 and between the spread spectrum coding signal generation circuit 2 and the mixer 39 or between the oscillator 30 and the mixer 33. Further, the phase adjusting circuit 35 can be provided at any position between the receiving antenna 23 and the reflection antenna 34.

Moreover, modifications of this embodiment are possible. For example, the transmitting antenna 3 of the interrogator 41, the receiving antenna 38 of the interrogator 41, the receiving antenna 23 of the responder 44, and the reflection antenna 34 of the responder 44 may have circularly polarizing functions. In this case, the polarizing directions are selected to be the same direction. For example, these antenna have right circularly polarizing functions. The interrogating signal X3 is right circularly polarized. The reflected waves to the receiving antenna 38 from the reflective objects other than the responder 44 are left circularly polarized, so that if the responding signal Y3 is right circularly polarized, the responding signal Y3 is distinguished from reflection waves from other reflective objects by a degree of crossing of the polarization of the responding signal Y2 and the reflected waves from other reflective objects.

If the transmitting antenna 3 of the interrogator 41, the receiving antenna 38 of the interrogator 41, the receiving antenna 23 of the responder 44, and the reflection antenna 34 of the responder 44 may have linear polarizing functions, the transmitting antenna 3 of the interrogator 41 has the same polarizing direction as the receiving antenna 23 of the responder. Moreover, the reflection antenna 34 has the same polarizing direction as the receiving antenna 38 but different from the polarizing direction of the transmitting antenna 3 and the receiving antenna 23 by 90 degrees, so that the responding signal can be distinguished from reflected waves from other reflective objects. For example, if the interrogating signal X3 is vertical polarized, reflected waves from other than the responder 44 are vertically polarized. Therefore, if the responding signal Y3 is horizontally polarized and the receiving antenna 38 is provided for selectivity receiving horizontally polarized waves, the responding signal Y3 is distinguished from reflected waves from other reflective objects. In this case, the polarizing direction converting portion 36 is provided by arranging the receiving antenna 23 to have a perpendicular relation to the reflection antenna 34 as a simple structure.

That is, in the case of the circularly polarizing, the transmitting antenna 3 and the receiving antenna 38 of the interrogator 41 has the same circularly polarizing direction. In the case of the linearly polarizing, these antennas have the different polarizing directions by 90 degrees, the polarizing conversion portion 36 is provided between the receiving antenna 23 and the reflection antenna 34 and the receiving antenna 38 has the same polarizing direction as the reflection antenna 34 of the responder 44. Therefore, the responding signal has the different polarizing direction from reflected waves from other reflective objects, so that effect of the reflected waves is reduced.

As mentioned above, according to this embodiment, though plural interrogators exist in the same service area, each interrogator can operate without effect from other interrogators. Further, the spread spectrum coding signal generation circuit 2 is used commonly in the transmitting processing of the interrogating signal and the modulating processing of the responding signal in the interrogator 41. Moreover, a simple circuit structure can be provided because a complicated phase matching is not required. The distance between the interrogator and the responder can be calculated by detecting a phase deviation from the reference distance. Moreover, the responding signal can be distinguished from the reflected waves from other reflective objects to reduce effect of the other interrogators.

Figure 4:
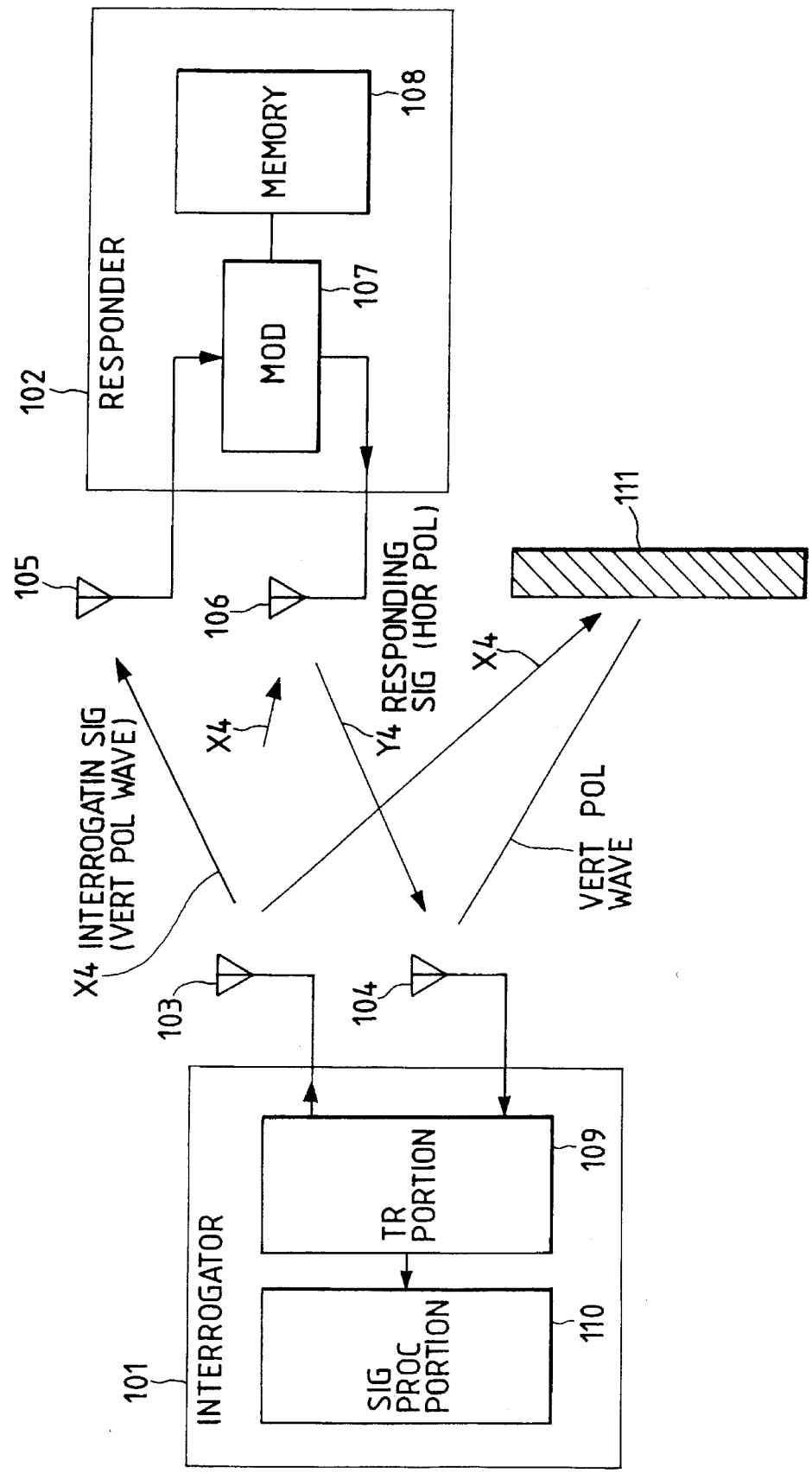
FIG. 4 is a block diagram of a fourth embodiment of an automatic vehicle identification system of this invention.

FIG. 4 is a block diagram of a fourth embodiment of an automatic vehicle identification system of this invention. An interrogator 101 comprises a transmitting and receiving portion 109, a signal processing portion 110, a vertical polarizing transmitting antenna 103 for transmitting an interrogating signal X4 of vertical polarizing waves, and a horizontally polarizing receiving antenna 104. A responder 102 comprises a vertically polarizing receiving antenna 105, a modulator 107 for modulating a received signal by the vertically polarizing receiving antenna 105 in accordance with data read from a memory 108, and a horizontally polarizing reflection antenna 106 for reflecting the interrogating signal X4 to be horizontally polarized in accordance with the modulated signal from the modulator 107.

The transmitting and receiving portion 109 outputs a radio frequency signal obtained by modulating a carrier signal with a predetermined signal including periodically repeated data train, such as a pseudo noise signal. The radio frequency signal is transmitted by the vertically polarizing transmitting antenna 103 as an interrogating signal X4. The responder 102 receives the transmitted predetermined signal by the vertically polarizing receiving antenna 105. The modulator 107 in the responder 102 modulates the received predetermined signal with data stored in the memory 108. The reflection antenna 106 reflects the interrogating signal X4 in accordance with the modulated signal by the horizontally polarizing reflection antenna 106 as a responding signal Y4.

The interrogator 101 receives the responding signal Y4 through the horizontally polarizing receiving antenna 104. The received responding signal Y4 is supplied to the signal processing portion 110 to analyzes the received data using data stored in a memory thereof (not shown) to identify the responder 102 with the result of the analysis.

The transmitted vertically polarizing predetermined signal from the interrogator 101 is reflected by reflective objects, such as a reflect object 111. However, the reflected signal from the reflective object 111 is polarized vertically, so that the horizontally polarizing receiving antenna 4 does not receive the reflected signal from any reflective objects substantially. Therefore, the responding signal Y4 from the responder 102 can be distinguished from reflected signals from any other reflective objects.

Figure 5:
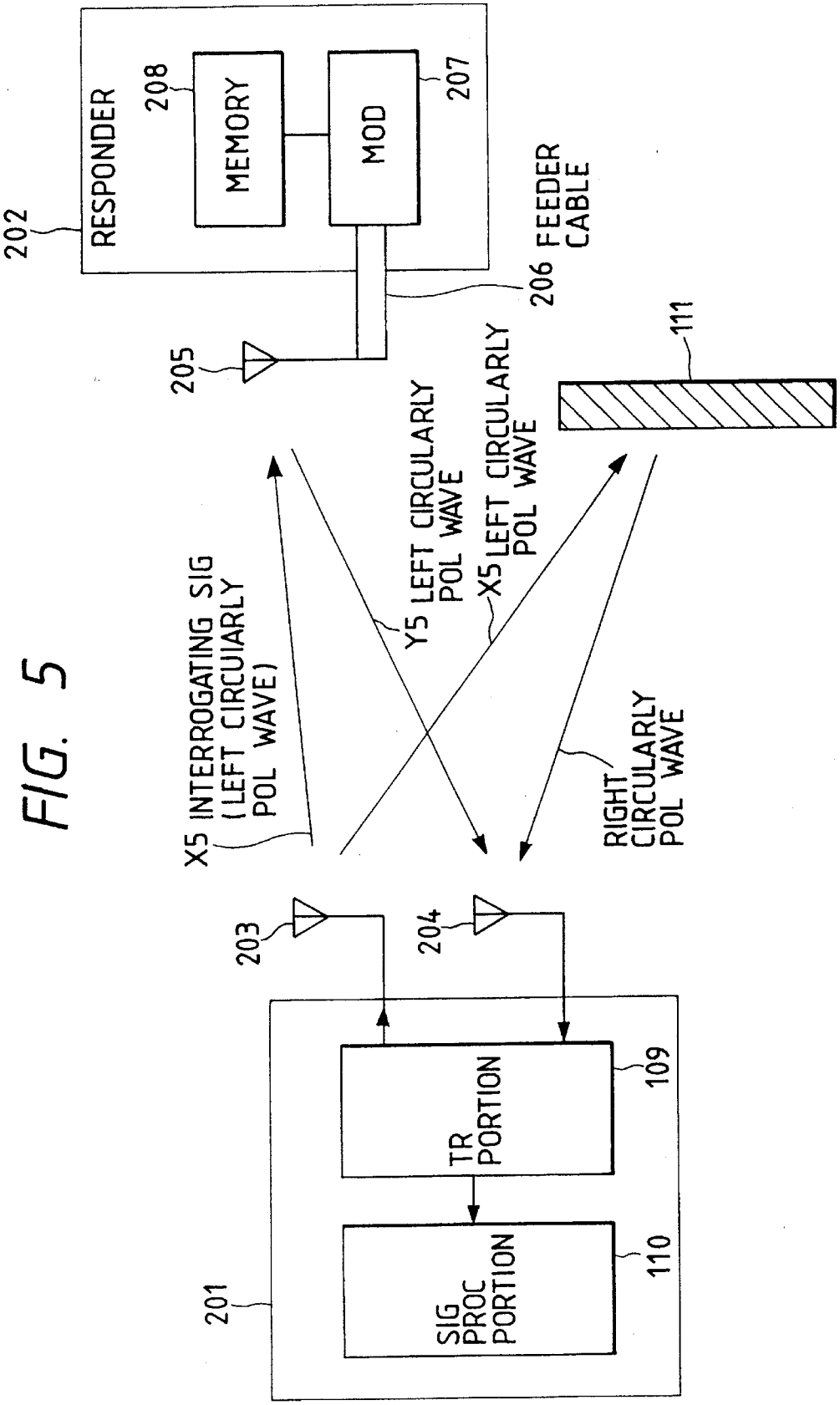
FIG. 5 is a block diagram of a fifth embodiment of an automatic vehicle identification system.

FIG. 5 is a block diagram of a fifth embodiment of an automatic vehicle identification system. An interrogator 201 comprises a transmitting and receiving portion 109, a signal processing portion 110, left circularly polarizing antennas 203 and 204. A responder 202 comprises a left circularly polarizing antenna 205, a feeder cable 206 for feeding a received interrogating signal to a modulator 207, the modulator 207 for modulating a received signal by the left circularly polarizing antenna 205 in accordance data read from a memory 208.

The modulator 207 modulates the interrogating signal X5 from the interrogator 201, i.e., the left circularly polarizing wave from the interrogator 201 by changing an impedance condition of the feeder cable 206 in accordance with the read data from the memory 208.

The transmitter and receiving portion 109 supplies a radio frequency signal obtained by modulating a carrier signal with a predetermined signal including periodically repeated data train, such as a pseudo noise signal. The radio frequency signal is transmitted through the left circularly polarizing antenna 203. The responder 202 receives the transmitted predetermined signal by the left circularly polarizing antenna 205. The modulator 207 in the responder 202 modulates the received predetermined signal with data stored in the memory 208. The modulator 207 modulates the interrogating signal X5 from the interrogator 201 by changing the impedance condition of the feeder cable 206 in accordance with the read data from the memory 208. The left circularly polarizing antenna 205 reflects the interrogating signal X5 in accordance with the modulation data from the memory 208 as a left circularly polarizing wave, or responding signal Y5.

The interrogator 201 receives the responding signal Y5 through the left circularly polarizing antenna 204. The responding signal is supplied to the signal processing portion 110 to analyzes the received data using data stored in a memory thereof (not shown) to identify the responder with the result of the analysis.

The transmitted left circularly polarizing interrogating signal X5 from the interrogator 201 is reflected by reflective objects, such as the reflect object 111. However, the reflected waves from the reflective object 111 are polarized right circularly, so that the left circularly polarizing receiving antenna 204 does not receive the reflected waves from any reflective objects. Therefore, the responding signal Y5 from the responder 202 can be distinguished from reflected waves from any other reflective objects.

Figure 6:
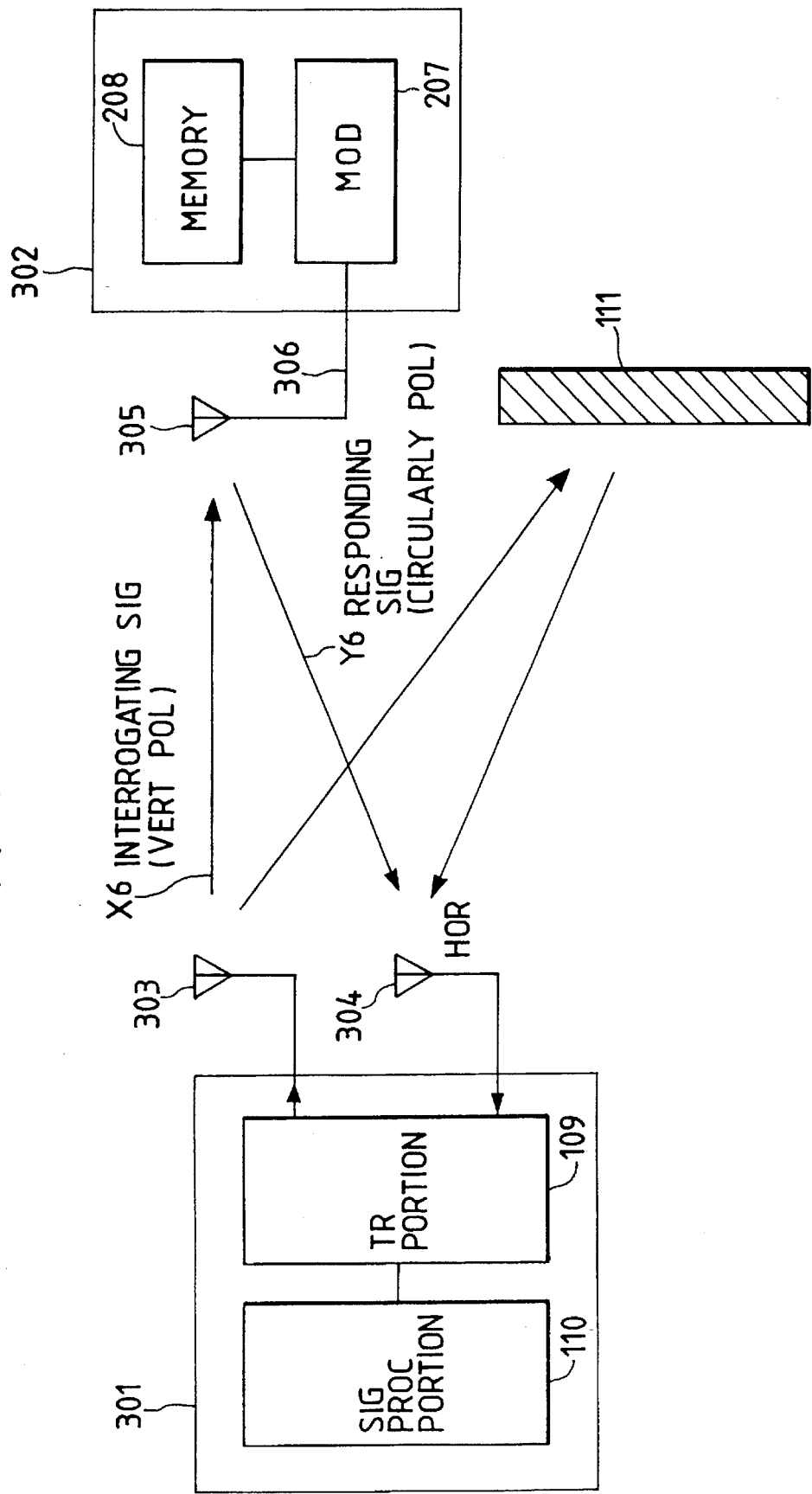
FIG. 6 is a block diagram of a sixth embodiment of an automatic vehicle identification system.
Figure 7:
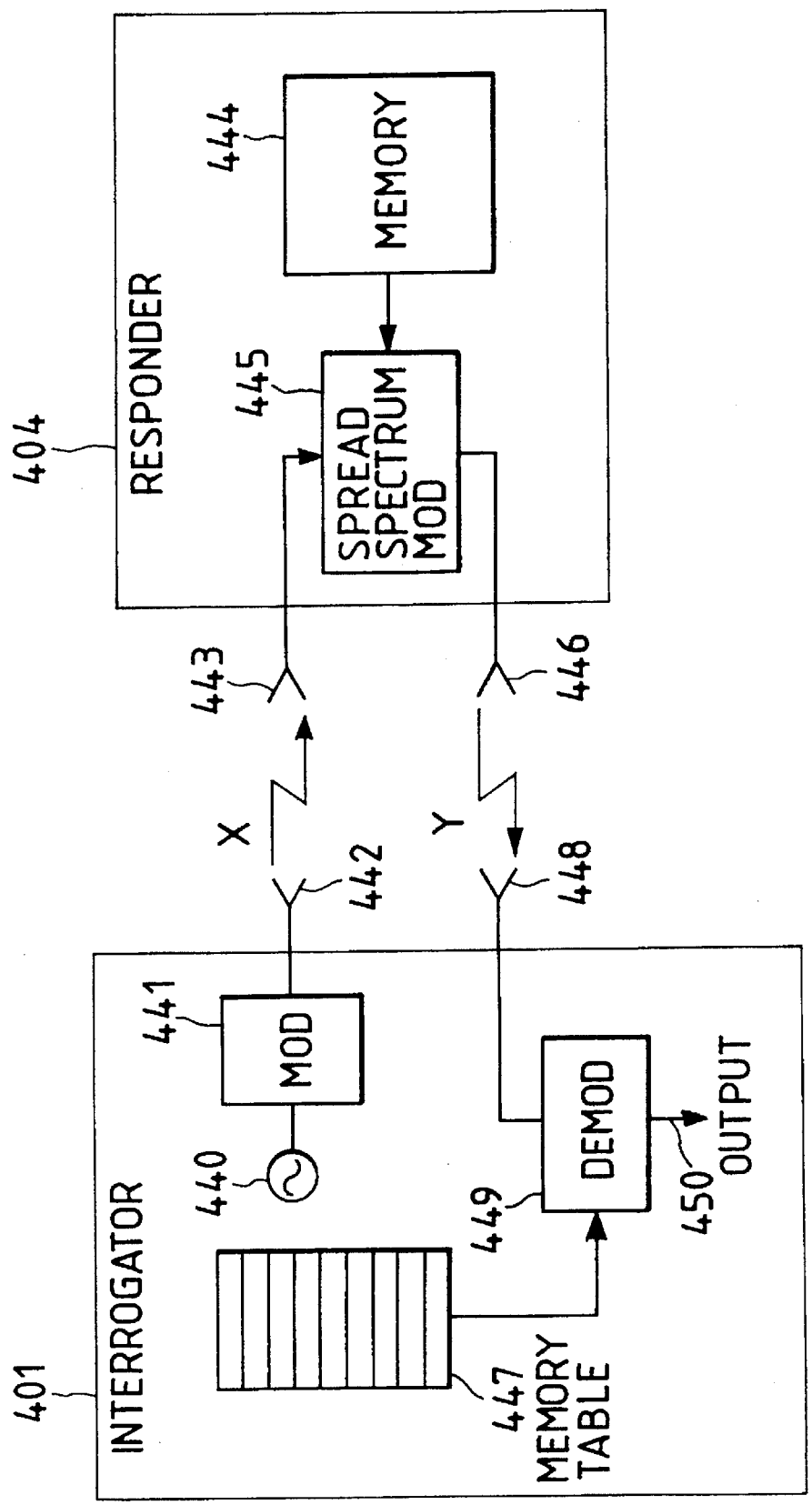
FIG. 7 is a block diagram of such a prior art automatic vehicle identification system.

FIG. 6 is a block diagram of a sixth embodiment of an automatic vehicle identification system. An interrogator 301 comprises a transmitting and receiving portion 109, a signal processing portion 110, a vertically polarizing antenna 303 and a horizontally polarizing wave receiving antenna 304. A responder 302 comprises a circularly polarizing antenna 305 for receiving a left circularly polarized component from the vertically polarized interrogating signal X6, a feeder cable 306 for feeding a received interrogating signal X6 to a modulator 207, the modulator 207 for modulating the received signal by reflecting the left circularly polarized component in the interrogating signal X6 by the left circularly polarizing antenna 305 in accordance data read from a memory 208.

The modulator 207 modulates the interrogating signal X6 from the interrogator 301 by changing an impedance condition of the feeder cable 306 in accordance with the read data from the memory 208.

The receiving antenna 304 received a horizontally polarized component of the reflected left circularly polarized wave of the responding signal Y6. The horizontally polarized component of the responding signal Y6 is supplied to the signal processing portion 110 to analyzes the received data using data stored in a memory thereof (not shown) to identify the responder with the result of the analysis.

The transmitted vertically polarizing interrogating signal from the interrogator 301 is reflected by reflective objects, such as a reflect object 111. However, the reflected waves from the reflective object 111 are vertically polarized, so that the horizontally polarizing receiving antenna 304 does not receive the reflected waves from any reflective objects. Therefore, the responding signal Y6 from the responder 302 can be distinguished from reflected waves from any other reflective objects.

What is claimed is:

1. A mobile unit identifying system comprising:
    (a) an interrogator having:
        spread spectrum signal generation means for generating a spread spectrum coding signal using a predetermined pseudo noise signal; and
        a transmitting antenna for transmitting said spread spectrum coding signal; and
    (b) a responder having:
        storing means for storing data;
        modulation means for modulating radio signals including said transmitted spread spectrum coding signal with said data; and
        sending means for sending the modulated radio signals to said interrogator, said interrogator further comprising:
        a receiving antenna for receiving said sent radio signals; and
        mixing means for mixing said received radio signals with said spread spectrum signal to detect said data.

2. A mobile unit identifying system as claimed in claim 1, wherein said spread spectrum coding signal generation means comprises carrier signal generation means for generation a carrier signal and pseudo noise signal generation means for generating said pseudo noise signal, and a second mixing means for mixing said carrier signal with said pseudo noise signal.

3. A mobile unit identifying system as claimed in claim 1, further comprising detection means for detecting phase difference between said spread spectrum coding signal and said sent and received spread spectrum coding signal included in said sent and received radio signals and calculation means for calculating a distance between said interrogator and said responder in accordance with said detected phase difference.

4. A mobile unit identifying system as claimed in claim 1, wherein said sending means comprises an antenna and said modulating means modulates said radio signals with said data by changing an impedance condition between said antenna and said modulating means.

5. A mobile unit identifying system as claimed in claim 4, wherein said modulating means comprises an antenna and modulates said radio signals with said data by alternating reflecting and terminating said radio signals from said antenna.

6. A mobile unit identifying system as claimed in claim 1, wherein said transmitting antenna comprises first circularly polarizing antenna means for transmitting said spread spectrum coding signal with circularly polarizing in a predetermined rotational direction, said modulation means comprises an antenna which includes second circular polarizing antenna means for selectively terminating and reflecting first radio frequency components circular polarized in said predetermined rotational direction, and said receiving antenna comprises third circularly polarizing antenna means for selectivity receiving second radio frequency components circularly polarized in said predetermined rotational direction.

7. A mobile unit identifying system comprising:
(a) an interrogator having:
spread spectrum signal generation means for generating a spread spectrum coding signal using a predetermined pseudo noise signal;
carrier signal generation means for generating a carrier signal;
first mixing means for mixing said spread spectrum coding signal with said carrier signal to produce an interrogating signal; and
a transmitting antenna for transmitting said interrogating signal; and
(b) a responder having:
storing means for storing data;
modulation means for modulating radio signals including said transmitted spread spectrum coding signal with said data; and
sending means for sending said modulated radio signals, said interrogator further comprising:
a receiving antenna for receiving said sent radio signals;
second mixing means for mixing said received radio signals with said carrier signal; and
third mixing means for mixing an output signal of said second mixing means with said spread spectrum signal to detect said data.

8. A mobile unit identifying system comprising:
(a) an interrogator having:
spread spectrum signal generation means for generating a spread spectrum coding signal using a predetermined pseudo noise signal;
a first antenna for transmitting said spread spectrum coding signal; and
(b) an responder having:
a second antenna for receiving radio signals including said transmitted spread spectrum coding signal;
storing means for storing data;
modulating means for modulating said received radio signals including said transmitted spread spectrum coding signal with said data;
a third antenna for sending said radio signals to said interrogator with modulating in accordance with said modulated radio signals, said interrogator further comprising:
a fourth antenna for receiving said sent radio signals; and
mixing means for mixing said sent and received radio signals with said spread spectrum signal to detect said data.

9. A mobile unit identifying system as claimed in claim 8, wherein said responder further comprises first phase adjusting means, provided between said second and third antennas, for delaying said received spread spectrum coding signal received by said second antenna with a predetermined delay time and said interrogator further comprises: second phase adjusting means for adjusting a phase relation between said received radio signals and said spread spectrum coding signal in accordance with said delay time.

10. A mobile unit identifying system as claimed in claim 8, wherein said first antenna transmits said spread spectrum coding signal linearly polarized in a first direction, said second antenna receives said spread spectrum coding signal linearly polarized in said first direction, said third antenna sends said modulated radio signals linearly polarized in a second direction perpendicular to said first direction, and said fourth antenna receives said sent radio signals linearly polarized in said second direction.

11. A mobile unit identifying system as claimed in claim 1, wherein said transmitting antenna transmits said spread spectrum coding signal with linearly polarizing in a first direction, said antenna sends said radio signals with circularly polarizing, and said receiving antenna receives a component in said sent radio signal, said component linearly polarized in a second direction perpendicular to said first direction.

12. An interrogating apparatus for identifying a responder existing in a service area of said interrogating apparatus, comprising:
(a) spread spectrum signal generation means for generating a spread spectrum coding signal using a predetermined pseudo noise signal;
(b) a transmitting antenna for transmitting said spread spectrum coding signal;
(c) a receiving antenna for receiving said modulated radio signals which may includes a responding signal made by modulating said transmitted spread spectrum coding signal with data by said responder; and
(d) mixing means for mixing said received radio signals including said responding signal to detect said data.

13. A mobile unit identifying system comprising:
a responder and an interrogator for identifying said responder existing in a service area of said interrogator, said interrogator comprising:
spread spectrum signal generation means for generating a spread spectrum coding signal using a predetermined pseudo noise signal;
a transmitting antenna for transmitting said spread spectrum coding signal;

a receiving antenna for receiving said modulated radio signals which may include a responding signal made by modulating said transmitted spread spectrum coding signal with data by said responder; and mixing means for mixing said received radio signals including said responding signal to detect said data, said responder comprising:

storing means for storing data;

modulation means for modulating radio signals including said transmitted spread spectrum coding signal with said data; and sending means for sending said modulated radio signals.

14. A mobile unit identifying system as claimed in claim 1, wherein said modulation means modulates said radio signals directly.

15. A mobile unit identifying system as claimed in claim 7, wherein said modulation means modulates said radio signals directly.

16. A mobile unit identifying system as claimed in claim 8, wherein said modulation means modulates said radio signals directly.

17. A mobile unit identifying system as claimed in claim 13, wherein said modulation means modulates said radio signals directly.

* * * * *